May 25, 1937.  E. E. HEWITT  2,081,451
SPRING PRESSED DEVICE
Filed May 12, 1934
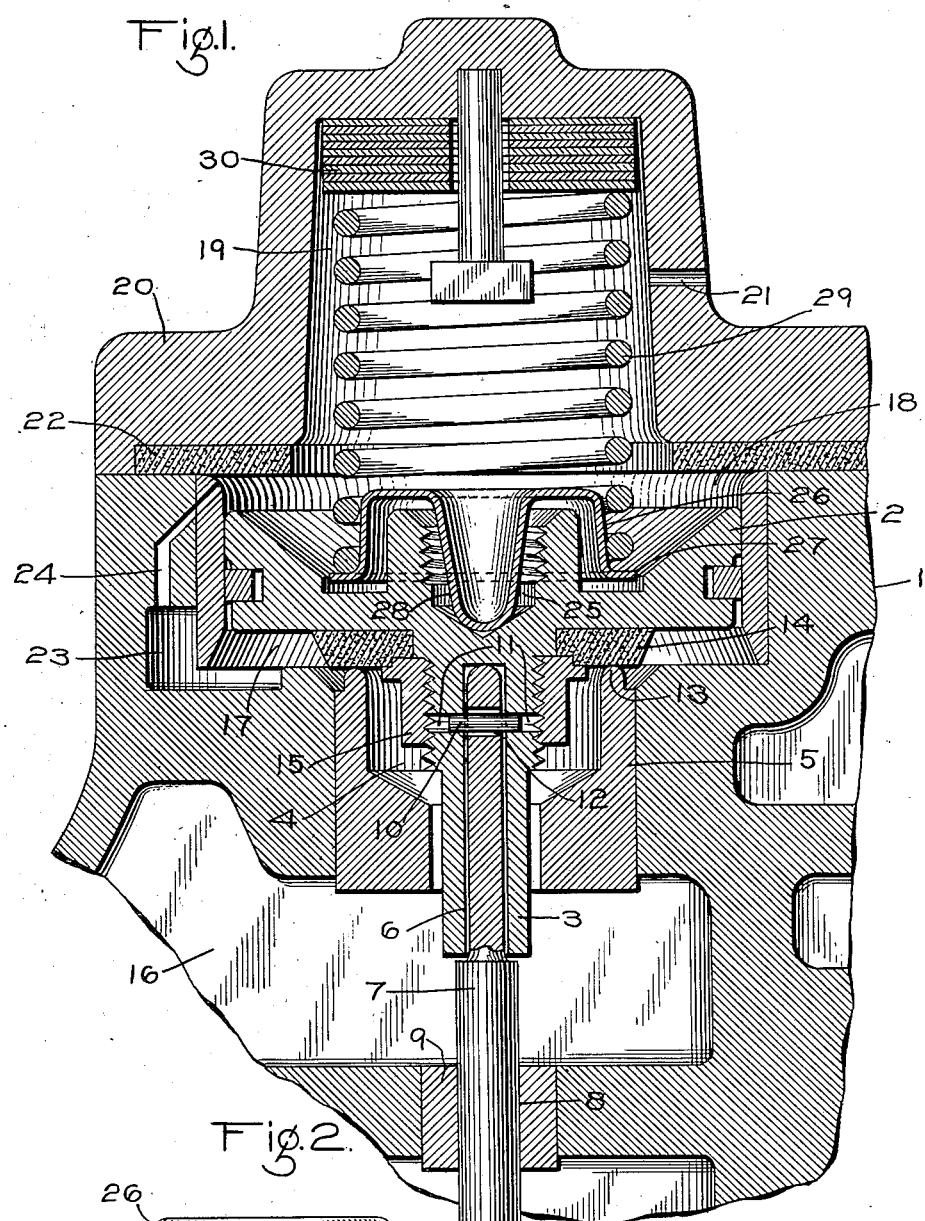
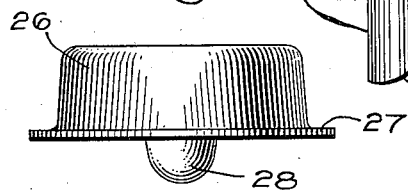
INVENTOR
ELLIS E. HEWITT
BY
Wm. N. Cady
ATTORNEY Patented May 25, 1937

2,081,451

UNITED STATES PATENT OFFICE 2,081,451

SPRING PRESSED DEVICE

Ellis E. Hewitt, Edgewood, Pa., assignor to The Westinghouse Air Brake Company, Wilmerding, Pa., a corporation of Pennsylvania Application May 12, 1934, Serial No. 725,335

10 Claims. (Cl. 137—153)

This invention relates to a valve device of the type particularly adapted to control the flow of fluid under pressure from one chamber to another chamber.

In a valve device of the type having a valve seat disc carried by a piston subject to the pressure of a coil spring for effecting a seal, if the pressure exerted by the spring should be unevenly distributed on the piston, due, for instance, to the bearing surface of either of the end coils of the spring being oblique with respect to the axis of the spring, the piston will be cocked, with the result that the seat disc will fail to bear evenly on its seat and thereby possibly permit leakage of fluid under pressure past the valve seat disc. If the piston is movable by fluid pressure against spring pressure into sealing engagement with a gasket and the piston should be cocked, the piston will not bear uniformly against the gasket and consequently leakage of fluid under pressure may occur between the piston and gasket. Moreover, a cocked piston, because of its tendency to bind, requires an increased differential to move it, with the result that the sensitivity and reliability of the device is interfered with.

The principal object of the invention is to provide improved means for applying the pressure of a spring uniformly about the axis of a piston.

Another object of the invention is to provide in a mechanism comprising a piston having associated therewith an operating stem slidably extending through a bore, an improved construction whereby slight misalignment of the axes of said piston and bore, such as might be caused by manufacturing variations, is prevented from causing the stem to bind and thereby the piston to cock and bind.

Other objects and advantages will appear from the following more detailed description of the invention.

In the accompanying drawing; Fig. 1 is a sectional view of a portion of a valve device embodying the invention; and Fig. 2 is an elevational view of the spring seat shown in section in Fig. 1.

As shown in the drawing, the valve device comprises a casing 1 containing a piston 2 having a stem 3 freely extending through a bore 4 in a bushing 5 mounted in said casing, said stem being provided with an axial bore 6 for the reception of one end of an operating stem 7, which may be slidably guided within a bore 8 in a bushing 9 mounted in casing 1. The stem 7 is a loose fit within the bore 6, so that misalignment of the bores 6 and 8, due, for instance to variations in manufacture, will not cause the stem 7 to bind in the bushing 9 nor to cock the piston 2.

The upper end of the operating stem 7 is rounded off and this rounded off end is adapted to engage the bottom of the bore 6, the bottom of said bore being substantially at right angles to the axis of the piston. Due to this construction, the end of the stem 7 will engage the bottom of said bore substantially at the axis of the piston 2, regardless of any slight obliquity of said stem relative to the axis of the piston due to misalignment of the bore 8 in the bushing 9 and the axis of the piston. Thus, the thrust of the stem 7 is applied substantially at the axis of the piston and there is therefore substantially no tendency from this cause to cock the piston.

For the purpose of holding the operating stem 7 assembled to the piston 2 while the parts are being assembled in the casing, a pin 10 is provided which is received within openings 11 in the piston stem 3 and a registering opening 12 in the operating stem 7. The diameter of the openings 11 is larger than the diameter of the pin 10 by an amount which will preferably permit the pin to be readily inserted therein by hand, for the purpose of facilitating assembly, and sufficient clearance is provided around the pin within the opening 12 to insure that the thrust of the operating stem 7 will not be applied to the pin.

The upper end of the bushing 5 is provided with an annular seat rib 13, and adapted to seat on said seat rib is a gasket 14 secured to one side of the piston 2 by a nut 15 having screw-threaded connection with the stem 3. The nut 15, when screw-threaded into position on the stem 3, closes the outer ends of the openings 11, so that the pin 10 is prevented from working out of said openings. The length of the pin is such that the ends thereof will remain within the respective openings 11, even though the pin may shift rightwardly or leftwardly to either one of its extreme positions.

The gasket 14 acts as a valve to control the flow of fluid under pressure from the bore 4, as supplied thereto from a fluid pressure supply chamber 16 through the clearance between the stem 3 and the wall of said bore, to a chamber 17 at the lower side of the piston 2.

At the upper side of the piston 2, the casing 1 is provided with a chamber 18 which opens into a chamber 19 in a cover portion 20 which may be secured to the casing by means of bolts. The chamber 19 may be open to the atmosphere through a passage 21 in the cover portion 20. A gasket 22 is clamped between the cover portion and casing so as to provide an air-tight joint between the members.

A by-pass communication from chamber 17 to chamber 18 around the piston 2 is provided, which may comprise a cavity 23 in the casing 1 open to chamber 17 and also open to a passage 24 leading to chamber 18. The object of this by-pass communication is to permit fluid under pressure which may leak past the gasket 14 from the bore 4 into chamber 17 to flow to chamber 18 and thence to the atmosphere through chamber 19 and passage 21, thus preventing the development of fluid pressure in chamber 17 when not intended.

According to one feature of the invention, the piston 2 has, on the side facing chamber 18, an axial recess 25 shaped preferably like a hollow cone, with the sides sloping toward the axis of the piston.

A spring seat member 26 is provided which is shaped like an inverted pan and has its edge turned outwardly to form a spring seat 27. The central portion of the spring seat member is depressed so as to form a protuberance 28 having an end shaped like a portion of a sphere, which end engages the sloping sides of the recess 25.

A spring 29 is contained in chambers 18 and 19, being under initial compression between shims 30 mounted in the outer end of chamber 19 and the spring seat 27 on the member 26. Thus, the spring 29 acts through the spring seat member 26 to urge the piston 2 to its lower position, in which the gasket 14 seats on the seat rib 13.

It will be noted that the rounded end of the protuberance 28 is the only portion of the spring seat member 26 which engages the piston 2 and it is evident that, due to this rounded form of the end of the protuberance, the spring seat member 26 will adjust its position on the piston in accordance with the degree of obliquity which may exist between the bearing surface of the end coils of the spring 29 and the axis thereof. The rounded end of the protuberance 28 has a narrow line-like circular bearing against the piston 2 within the recess 25, said bearing being concentric with the axis of said piston. Thus, the pressure applied by the spring 29 to the spring seat member 26 is distributed uniformly around the axis of the piston and acts in a direction parallel to said axis.

With the pressure of the spring 29 applied uniformly about the axis of the piston 2 and with the operating stem 7 acting substantially at the axis of said piston and with clearance provided around said stem within the bore 6, the piston is free to adjust itself relative to the stem and spring for, in one position, effecting alignment of the gasket 14 and the seat rib 13 and for, in another position, effecting alignment of the upper face of said piston and the lower face of the gasket 22. Thus, when the piston is in its lower or valve seating position, the gasket 14 will bear evenly on the seat rib 13 and thereby prevent leakage of fluid under pressure past said gasket from the bore 4 to chamber 17. Also, when the piston is moved to its upper or valve opening position, into engagement with the gasket 22, said piston will bear evenly against said gasket and effect sealing engagement therewith, so that fluid under pressure supplied to passage 24 from chamber 17 will not leak past said piston into chamber 19 and thence to the atmosphere through passage 21.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. The combination with a fluid pressure operated device comprising a casing containing a piston chamber and a cover portion adapted to close one end of said chamber of an annular gasket adapted to provide a seal between said casing and cover portion, a piston operatively mounted in said chamber and adapted to engage said gasket for effecting a leak-proof seal, said piston having a stem provided with an axial bore, and an operating stem slidably mounted in a bore in said casing and having an extension of smaller diameter than that of said axial bore extending through said axial bore into engagement with said piston for operation thereby, and means cooperatively associated with said operating stem and piston for permitting said piston to adjust its position relative to said operating stem so as to insure leak-proof engagement of said piston with said gasket, regardless of slight misalignment of said bores.

2. A valve device comprising a casing containing a piston chamber, a cover portion adapted to close one end of said chamber, an annular gasket adapted to provide a seal between said casing and cover portion, a piston operatively mounted in said chamber and adapted to engage said gasket for effecting a leak-proof seal, said piston having a stem provided with an axial bore, a seat member, a gasket carried by said piston and adapted to engage said seat member, an operating stem slidably mounted in a bore in said casing and having an extension of smaller diameter than that of said bore extending into said axial bore into engagement with said piston for operation thereby, and means cooperatively associated with said operating stem and piston for causing the thrust of said operating stem to be applied substantially at the axis of said piston regardless of slight misalignment of said bores, for insuring, at one time, alignment of said piston and annular gasket and, at another time, alignment of said other gasket and seat member.

3. A fluid pressure operated device comprising a casing containing a piston chamber, a cover portion adapted to close one end of said chamber, an annular gasket adapted to provide a seal between said casing and cover portion, a piston operatively mounted in said chamber and adapted to engage said gasket for effecting a leak-proof seal, a spring acting on said piston for urging said piston out of engagement with said gasket, and means for permitting said piston to adjust its position relative to said spring so as to insure alignment of said piston with said gasket regardless of the obliquity of the bearing surfaces of the ends of said spring relative to the axis of said spring.

4. A fluid pressure operated device comprising a casing containing a piston chamber, a cover portion adapted to close one end of said chamber, an annular gasket adapted to provide a seal between said casing and cover portion, a piston operatively mounted in said chamber and adapted to engage said gasket for effecting a leak-proof seal, a spring acting on said piston for urging said piston out of engagement with said gasket, and means acted upon by said spring and cooperating with said piston for permitting said piston to adjust its position relative to said spring so as to insure alignment of said piston with said gasket regardless of the obliquity of the bearing surfaces of said spring relative to the axis of said spring.

5. A valve device comprising a casing containing a piston chamber, a cover portion adapted to close one end of said chamber, an annular gasket adapted to provide a seal between said casing and cover portion, a piston operatively mounted in said chamber and adapted to engage said gasket for effecting a leak-proof seal, a seat member, a gasket carried by said piston and adapted to engage said seat member, a spring acting on said piston for urging said piston away from engagement with said annular gasket and for urging said other gasket into engagement with said seat member, and means acted upon by said spring and cooperating with said piston for permitting said piston to adjust its position relative to said spring so as to insure, at one time, leak-proof engagement of said piston with said annular gasket and, at another time, leak-proof engagement of said other gasket with said seat member, regardless of the obliquity of the bearing surfaces of the ends of said spring relative to the axis of said spring.

6. A valve device comprising a casing containing a piston chamber, a cover portion adapted to close one end of said chamber, an annular gasket adapted to provide a seal between said casing and cover portion, a piston operatively mounted in said chamber and adapted to engage said gasket for effecting a leak-proof seal, said piston being provided with an axial recess, a seat member, a gasket carried by said piston and adapted to engage said seat member, a spring acting on said piston for urging said piston away from engagement with said annular gasket and for urging said other gasket into engagement with said seat member, and a spring seat member interposed between said spring and piston and engaging said piston within said recess, said spring seat member cooperating with said piston to permit said piston to adjust its position relative to said spring so as to insure, at one time, leak-proof engagement of said piston with said annular gasket and, at another time, leak-proof engagement of said other gasket with said seat member, regardless of the obliquity of the bearing surfaces of said spring relative to the axis of said spring.

7. A valve device comprising a casing having a bore, a movable abutment operatively mounted in said casing and having a stem provided with an axial bore, a seat member in said casing, a gasket carried by said abutment and adapted to engage said seat member, an operating stem slidably mounted in the first mentioned bore and having one end extending through said axial bore into engagement with said abutment for operation thereby, a spring acting on said abutment for urging said gasket into engagement with said seat member, and means for permitting said abutment to adjust its position so as to insure alignment of said gasket with the seat on said seat member, regardless of misalignment of said bores and the obliquity of the bearing surfaces at the ends of said spring relative to the axis of said spring.

8. A fluid pressure operated device comprising a casing containing a piston chamber, a cover portion adapted to close one end of said chamber, an annular gasket adapted to provide a seal between said casing and cover portion, a piston operatively mounted in said chamber and adapted to engage said gasket for effecting a leak-proof seal, said piston having a stem provided with an axial bore, an operating stem slidably mounted in a bore in said casing and having one end extending through said axial bore into engagement with said piston for operation thereby, a spring acting on said piston, and means for permitting said piston to adjust its position so as to insure alignment of said piston with said gasket, regardless of slight misalignment of said bores and the obliquity of the bearing surfaces at the ends of said spring relative to the axis of said spring.

9. A valve device comprising a casing, a movable abutment mounted in said casing and having a stem provided with a bore, an annular gasket having one side engaging said abutment and through the opening in which said stem extends, an operating stem extending into said bore, a pin extending through an opening in the first mentioned stem and a registering opening in said operating stem whereby said operating stem is secured to the first mentioned stem, and means engaging the opposite side of said gasket for clamping said gasket against said abutment and for closing off the outer end of said opening in the first mentioned stem.

10. A valve device comprising a casing, a movable abutment mounted in said casing and having a stem provided with a bore, an annular gasket having one side engaging said abutment and through the opening in which said stem extends, an operating stem extending into said bore, a pin extending through an opening in the first mentioned stem and a registering opening in said operating stem whereby said operating stem is secured to the first mentioned stem, and a nut having screw-threaded engagement with the first mentioned stem for clamping said gasket against said abutment and for closing off the outer end of said opening in the first mentioned stem.

ELLIS E. HEWITT.